United States Patent [19]

Augustyniak

[11] Patent Number: 5,215,344
[45] Date of Patent: Jun. 1, 1993

[54] WINCH CABLE ATTACHMENT APPARATUS

[76] Inventor: Gerald Augustyniak, 312 Short St., Auburn, Mich. 48611

[21] Appl. No.: 601,036

[22] Filed: Oct. 23, 1990

Related U.S. Application Data

[63] Continuation of Ser. No. 337,949, Apr. 14, 1989, abandoned.

[51] Int. Cl.⁵ .................... B25J 1/00; B63B 21/04
[52] U.S. Cl. .................... 294/19.1; 114/221 R; 294/99.1
[58] Field of Search .................... 294/19.1, 19.2, 99.1, 294/102.1; 24/130, 336, 531; 114/221 R, 230; 403/289, 300, 305, 309, 310, 313, 314, 344

[56] References Cited

U.S. PATENT DOCUMENTS

| | | |
|---|---|---|
| 904,863 | 11/1908 | Glass et al. |
| 1,485,228 | 2/1924 | Johnson, Jr. |
| 1,821,488 | 9/1931 | Wetherbee |
| 2,076,359 | 4/1937 | Bay |
| 2,095,137 | 10/1937 | Johnson |
| 2,116,880 | 5/1938 | Dee |
| 2,595,712 | 5/1952 | Shearer et al. |
| 2,731,291 | 1/1956 | Bellini et al. ............ 294/19.1 |
| 2,979,013 | 4/1961 | Whittall ................. 114/221 |
| 3,085,775 | 4/1963 | Crates et al. |
| 3,098,462 | 7/1963 | Holzman ................ 114/221 |
| 3,273,928 | 9/1966 | Wisniewski ............ 294/19.1 |
| 3,327,376 | 6/1967 | Freeman et al. ........ 294/19.1 X |
| 3,722,940 | 3/1973 | Misjak .................. 294/19.1 |
| 3,781,051 | 12/1973 | Gibson et al. .......... 294/19.1 X |
| 3,841,685 | 10/1974 | Kolodziej .............. 294/19.1 |
| 3,913,515 | 10/1975 | Hernsjö et al. ......... 294/19.1 |
| 3,922,026 | 11/1975 | Schweitzer ............. 294/19.2 |
| 4,132,441 | 1/1979 | Watkins ................ 294/19.1 |
| 4,470,595 | 9/1984 | Johnston ............... 294/19.1 X |
| 4,793,646 | 12/1988 | Michaud, Jr. ........... 114/221 R |

FOREIGN PATENT DOCUMENTS 2429411 1/1976 Fed. Rep. of Germany ..... 294/19.1

*Primary Examiner*—Johnny D. Cherry
*Attorney, Agent, or Firm*—Learman & McCulloch

[57] ABSTRACT

An attachment for releasably gripping a hook at one end of a winch cable to facilitate coupling of the hook to a boat that is to be pulled from a body of water onto a trailer has a body provided with a hook-accommodating slot in one side thereof and a groove in the opposite side thereof for accommodating an elongated support. The slot is tapered and has side walls between which the hook may be wedged.

13 Claims, 2 Drawing Sheets

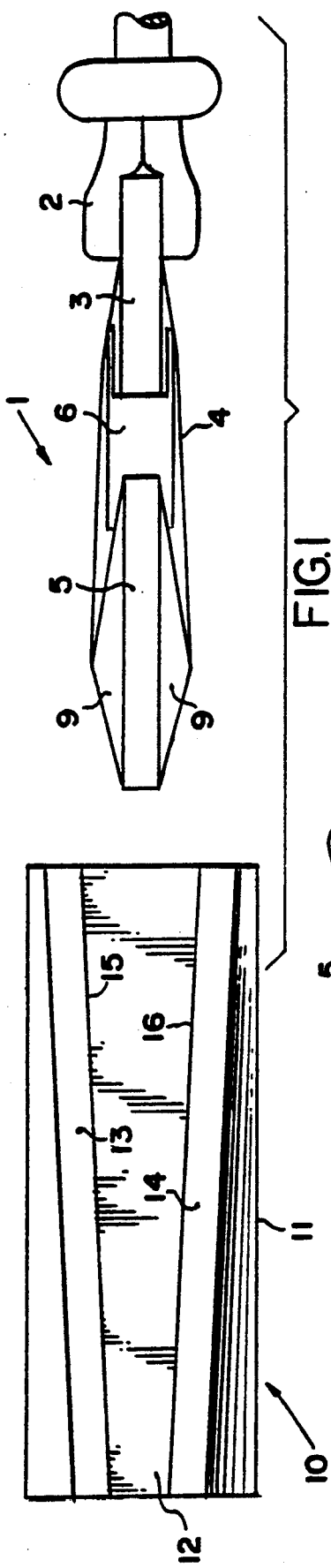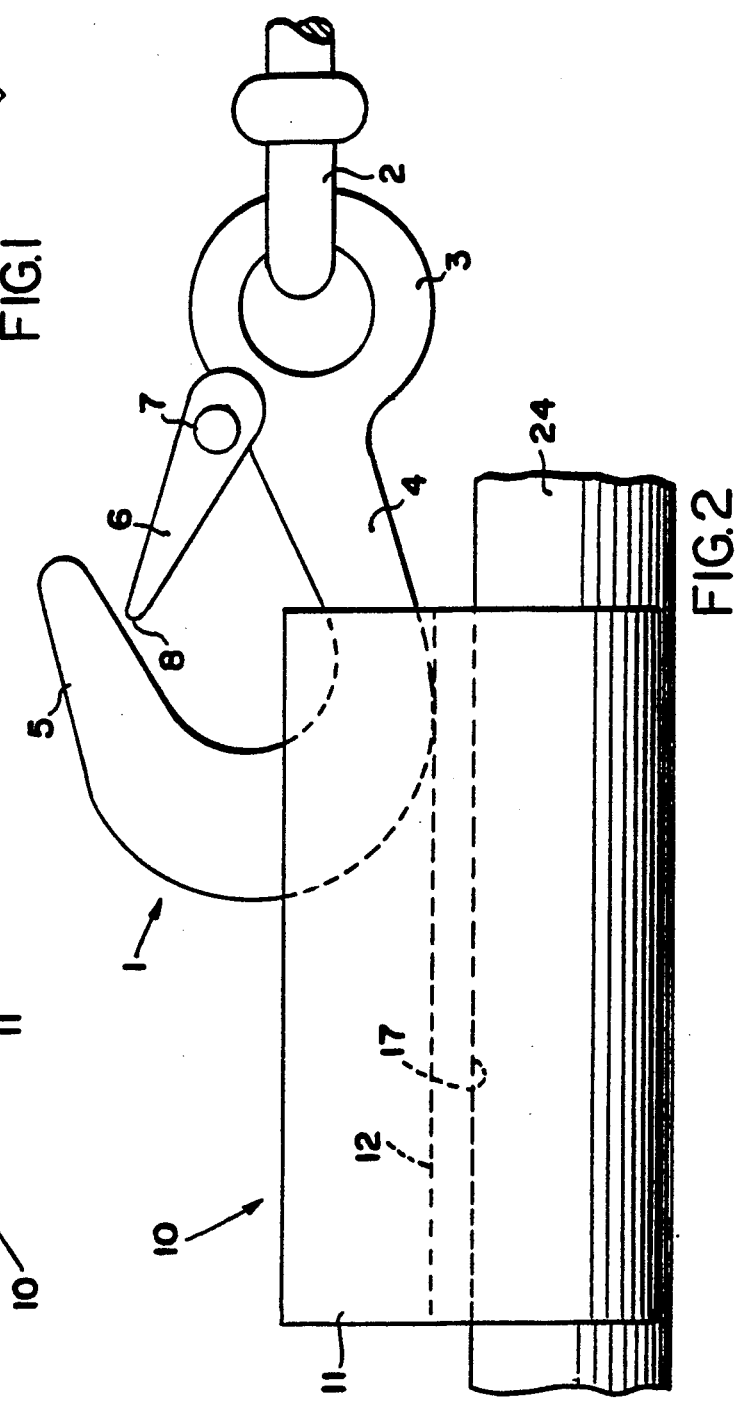

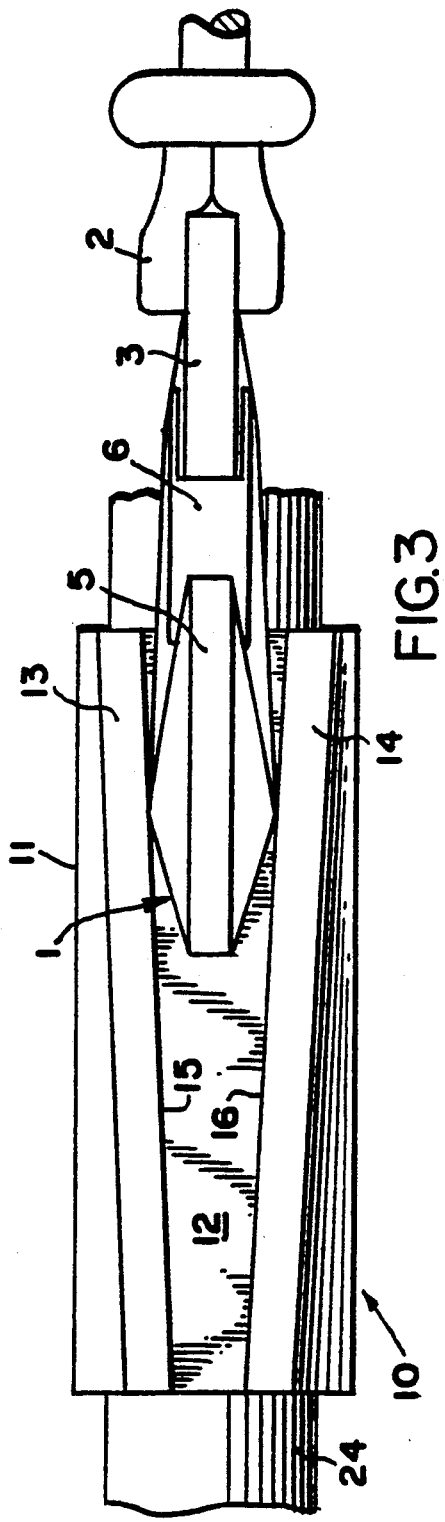
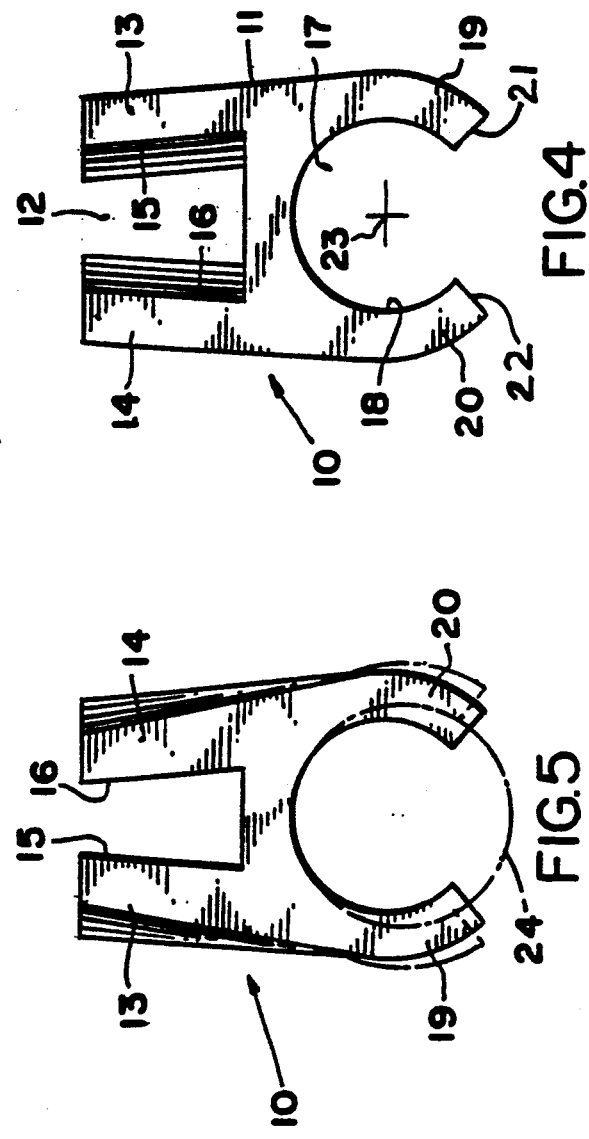
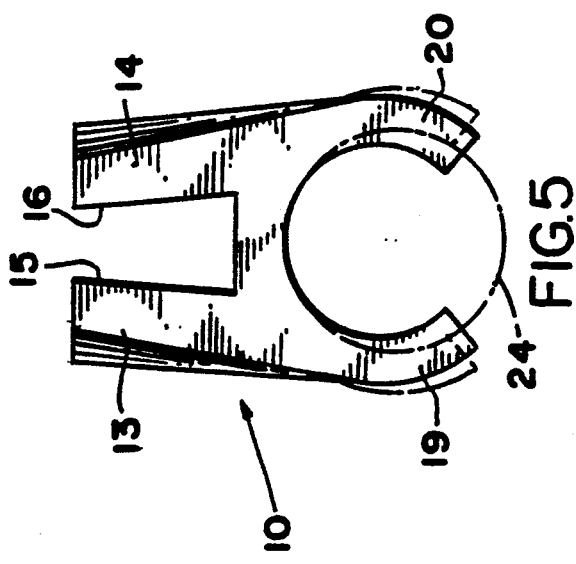

WINCH CABLE ATTACHMENT APPARATUS

This is a continuation of copending application Ser. No. 07/337,949 filed on Apr. 14, 1989, now abandoned.

This invention relates to apparatus for facilitating the coupling of a winch cable to a boat preparatory to fitting such boat onto a trailer.

BACKGROUND OF THE INVENTION

A fishing or similar other kind of boat conventionally is transported by means of a vehicle-drawn trailer on which the boat is removably supported. Conventionally the trailer is provided with a winch around which is trained a cable terminating at its free end in a hook that is adapted to be coupled to and removed from a ring fixed to the bow of the boat. Usually, the trailer on which a boat is supported during transport is backed along a ramp into a lake or stream to a depth sufficient to enable the boat to be floated off the trailer. Difficulty rarely, if ever, is encountered in floating a boat off its trailer. However, when the boat is to be returned to the trailer, it is necessary to attach the winch cable to the boat before the boat is drawn onto the trailer.

The winch cable conventionally has a hook at its free end that is adapted to be fitted to a ring or cleat fixed to the bow of the boat so as to enable the boat to be secured to the cable, following which the winch may be activated to wind the cable around the winch drum and thereby move the boat toward and onto the trailer.

Difficulty often is experienced in attaching the cable hook to the bow ring or cleat. Quite often the person seeking to return the boat to the trailer is unassisted and must either wade into the water or stand upon the trailer in a position to attach the cable hook to the ring or cleat. Often it is inconvenient or uncomfortable to wade into the water and it is not uncommon for a person standing on a trailer and reaching for the bow ring to slip and fall into the water.

Apparatus constructed in accordance with the invention is particularly useful in attaching a winch cable hook to the bow ring of a boat preparatory to moving such boat onto a trailer and without requiring the operator to wade or risk falling off the trailer.

SUMMARY OF THE INVENTION

Apparatus constructed in accordance with the invention comprises a rectangular block or body having in one side thereof a slot for the slideable accommodation of a hook that is fitted to one end of a winch cable. The slot is tapered so that at least a portion of the slot has a width less than the thickness of the hook thereby enabling the latter to be wedged in the slot and frictionally retained therein.

The other side of the block is provided with a groove for the removable accommodation of a support such as a mop handle, pike, or other elongate member by means of which the block and hook accommodated therein may be extended a substantial distance from the user to enable the hook to be fitted to a ring or cleat fixed on a boat.

The material from which the block or body is formed preferably is a plastic material that is substantially impervious to sun and water deterioration and has sufficient flexibility to accommodate a cable hook and the support securely and has sufficient frictional properties as to avoid unintentional relative movement between the block, the hook, and the support.

THE DRAWINGS

A presently preferred embodiment of the invention is disclosed in the accompanying drawings, wherein:

FIG. 1 is an exploded, top plan view of a cable winch hook and an attachment therefor preparatory to assembling the hook and the attachment;

FIG. 2 is a fragmentary, side elevational view, on an enlarged scale, illustrating the hook accommodated in the attachment and the attachment fitted to a support;

FIG. 3 is a top plan view, on a reduced scale, of the assembly shown in FIG. 2;

FIG. 4 is an elevational view of one end of the attachment separated from the support; and FIG. 5 is an elevational view of the opposite end of the attachment and illustrating in phantom lines the support assembled with the attachment.

DETAILED DESCRIPTION

Apparatus constructed in accordance with the invention is adapted for use in conjunction with a hook 1 fitted to the free end of a cable 2, the opposite end of which is secured to a rotatable winch (not shown) that is mounted on a boat trailer (not shown) in conventional manner. The hook has at one end thereof an eye 3 through which the cable 2 passes and from which extends a body or shank 4 terminating in a horn 5. A latch finger 6 is pivoted at one end to the shank 4 by means of a pivot pin 7. Preferably, the latch finger 6 is urged by a spring (not shown) to a position in which its free end 8 bears against or is adjacent the horn 5, as is shown in FIG. 2. However, the latch finger 6 is swingable about the axis of the pin 7 counterclockwise from the position shown in FIG. 2 so as to enable a ring or cleat (not shown) secured to a boat (not shown) to be accommodated within the hook. The shank 4 of the hook has opposite sides 9 which taper both horizontally and vertically from about the mid-point of the body.

The attachment 10 comprises a body 11 having at one side thereof a longitudinally extending, elongate slot 12 defined by a pair of upstanding ribs 13 and 14 having confronting walls 15 and 16, respectively. The slot tapers towards its open side as is best shown in FIGS. 4 and 5 and also tapers toward one end of the body so that the spacing between the walls 15 and 16 is different at opposite ends of the body. At one end of the body the spacing between the walls 15 and 16 is greater than the thickness of the shank of the hook 1, whereas at the opposite end of the body the spacing between such walls is less than the thickness of the cable hook shank.

The opposite side of the body 11 is provided with an elongate groove 17 which parallels the slot 12 and extends the full length of the body. The groove has an arcuate surface 18 and is flanked by arcuate limbs 19 and 20 which have free ends 21 and 22, respectively, whose surfaces extend substantially radially toward the center 23 of the arc on which the surface 18 is formed.

The groove 17 is adapted to accommodate an elongate support 24 such as a cylindrical mop or broom handle, a pike, or any other suitable member. The location of the groove 17 is such that the support 24 forms no obstruction to the slot 12. The diameter of the support member 24 preferably is somewhat greater than that of the groove 17 thereby enabling the arms 19 and 20 to grip the member 24 snugly when the latter is accommodated in the groove.

The material from which the attachment 10 is made preferably is one which has sufficient resilience to enable the limbs 19 and 20 to flex, as is shown in FIG. 5, to enable the member 24 to pass into and out of the groove 17 between the free ends 21 and 22 of the limbs. The material from which the attachment is made also should be sufficiently resilient to enable the hook 1 to displace the ribs 13 and 14 a distance sufficient to permit the shank 4 to be wedged in the slot 12 and gripped by the opposed walls 15 and 16. The material also should be one which has sufficient frictional properties as to ensure retention of the hook 1 in the slot 12 and the support 24 in the groove 17 without inadvertent relative movement between the attachment 10 and the parts 1 and 24. A suitable material having the specified properties is nylon.

When a boat in a body of water is to be fitted onto a trailer, the latter is backed down a ramp so that the rear portion is below the surface of the water a distance sufficient to enable one end, usually the bow, of the boat to be moved to a position in which it overlies the rear end of the trailer. Such a boat conventionally is fitted with a ring or cleat to which the hook 1 may be coupled, following which the winch may be operated to draw the boat onto the trailer.

Since the hook 1 must be coupled to the boat ring while the boat is afloat, and usually in a position rearwardly of the rear end of the trailer, difficulty has been experienced heretofore in fitting the hook to the ring without the user's getting wet or risking falling off the trailer By wedging the hook 1 in the slot 12, as shown in FIGS. 2 and 3, and by positioning the body 11 at one end of the elongate support 24, the hook 1 and the body 11 may be extended as a unit a substantial distance rearwardly of the trailer so as to be coupled to the boat ring. If it then is desired to separate the body 11 from the hook, it is a simple matter to push the body, by means of support 24, in a direction to withdraw the hook from the slot 12, following which the winch may be operated to draw the boat onto the trailer.

The disclosed embodiment is representative of a presently preferred form of the invention, but is intended to be illustrative rather than definitive thereof. The invention is defined in the claims.

I claim:

1. An attachment adapted for removable connection to a hook secured to one end of a cable, said hook having a shank, said attachment comprising a body formed of resilient material and having in one side thereof a slot which extends from one end of said body towards its opposite end and tapers substantially uniformly from a width greater than that of said shank at said one end of said body to a width less than that of said shank, thereby enabling said shank to enter said slot from said one end of said body and be removably wedged in said slot; and elongate support means connected to said body enabling said body and said hook when wedged in said slot to be supported and moved as a unit.

2. The attachment according to claim 1 wherein said slot extends the full length of said body.

3. The attachment according to claim 1 wherein said body has a groove in another side thereof in which said support means is accommodated.

4. The attachment according to claim 3 wherein said groove is flanked by a pair of flexible, opposed limbs which grip said support means.

5. The attachment according to claim 4 wherein said groove is of arcuate configuration and wherein said limbs terminate in free ends spaced from one another to form an opening through which said support means may pass into and out of said groove.

6. The attachment according to claim 5 wherein the free ends of said limbs have surfaces which extend radially toward the center on which said groove is formed.

7. An attachment adapted for removable connection to a hook secured to one end of a cable, said hook having a shank, said attachment comprising a body formed of resilient material and having spaced apart, confronting walls forming a slot, said slot extending from one end of said body towards its opposite end and tapering substantially uniformly from a width greater than that of said shank at said one end of said body to a width less than that of said shank, thereby enabling said shank to enter said slot from said one end of said body and be removably wedged in said slot, said body having a groove in another side of said body extending parallel to said slot for the removable accommodation of an elongate support.

8. The attachment according to claim 7 wherein said slot and said groove are at opposite sides of said body.

9. The attachment according to claim 7 wherein said body has an opening in communication with said groove to enable said support to be moved into and out of said groove.

10. The attachment according to claim 9 wherein said groove is arcuate and flanked by flexible limbs having free ends defining said opening.

11. The attachment according to claim 10 wherein said free ends have surfaces extending radially toward the center on which the arc of said groove is formed.

12. An attachment adapted for removable connection to a hook secured to one end of a cable, said hook having a shank, said attachment comprising a body formed of resilient material and having in one side thereof a slot open at one side thereof and extending from one end of said body towards its opposite end and tapering substantially uniformly from a width greater than that of said shank at said one end of said body to a width less than that of said shank, said slot also tapering in a direction toward said open side thereof thereby enabling said shank to enter said slot from said one end of said body, partially extend through the open side of said slot, and be removably wedged in said slot; and elongate support means connected to said body enabling said body and said hook when wedged in said slot to be supported and moved as a unit.

13. An attachment adapted for removable connection to a hook secured to one end of a cable, said hook having a shank, said attachment comprising a body formed of resilient material and having spaced apart, confronting walls forming a to open at one side thereof, said slot extending from one end of said body towards its opposite end and tapering substantially uniformly from a width greater than that of said shank at said one end of said body to a width less than that of said shank, said slot also tapering in a direction toward said open side thereof thereby enabling said shank to enter said slot from said one end of said body, partially extend through the open side of said slot, and be removably wedged in said slot, said body having a groove in another side of said body extending parallel to said slot for the removable accommodation of an elongate support enabling said body and said hook when wedged in said slot to be supported and moved as a unit.

* * * * *

UNITED STATES PATENT AND TRADEMARK OFFICE
CERTIFICATE OF CORRECTION

PATENT NO. : 5,215,344
DATED : June 1, 1993
INVENTOR(S) : Gerald Augustyniak

It is certified that error appears in the above-identified patent and that said Letters Patent is hereby corrected as shown below:

In the Abstract, line 6, change "elongated" to -- elongate --.

Column 3, line 29, after "trailer" insert a period.

Column 4, line 53, change "to" to -- slot --.

Signed and Sealed this

Eighteenth Day of January, 1994

Attest:

BRUCE LEHMAN

Attesting Officer    Commissioner of Patents and Trademarks